ated from the moisture containing outer
UNITED STATES PATENT OFFICE.

AARON CHARLES HORN, OF NEW YORK, N. Y.

PIGMENTED PLASTIC WATERPROOF TROWELING COMPOSITION.

1,080,632.  Specification of Letters Patent.  Patented Dec. 9, 1913.

No Drawing.  Application filed May 15, 1913.  Serial No. 767,855.

*To all whom it may concern:*

Be it known that I, AARON C. HORN, a citizen of the United States, and a resident of New York, in the county of New York and State of New York, have invented certain new and useful Improvements in Pigmented Plastic Waterproof Troweling Composition, of which the following is a specification.

This invention relates to plastic troweling waterproof cements intended for waterproofing structural surfaces and the like, and to the process of making same, involving a new form of waterproofed structure, and as to the composition it relates especially to a pigment containing cement having a high degree of plasticity or stiffly fluent mobility, marked adhesiveness to wall surfaces, yet working freely under the trowel without that measure of tackiness and "pull" which characterizes most resinous mixtures of similar body.

The treatment of structural surfaces of brick, concrete and other forms of masonry more or less porous and moisture transmitting in character to render same either impenetrable by moisture or to act as a moisture barrier usually resolves itself into the application to such surfaces of bitumen, paints or oil and resin compounds and the like, which although useful for waterproofing the surfaces of wood, often do not serve in filling the pores of rough surfaces of masonry to a degree sufficient to insure reliability of water shedding or deflecting qualities under all conditions.

In superstructural waterproofing, that is the treatment of walls above ground, it becomes necessary to insulate or dampproof an inner plastered surface from an outer weather exposed wall, and the present practice involves three methods, viz., that of furring, lining with hollow block, and coating with a bituminous paint. The furring operation is carried out by attaching to the wall furring strips in vertical position and securing lath or plaster board to these strips. The furring strips may be of angle iron, wood or metal covered wood and the laths may be metal or wood strips. Sheets of prepared furring-board may be used in lieu of laths. Plaster is applied to the surface thus created and being spaced a short distance from the masonry wall, and thus out of direct contact with it, is to some extent insulated from the moisture containing outer wall. Or the wall may be lined in various ways with hollow brick or block to which the plaster is subsequently applied.

The third method of superstructural dampproofing is that of applying to the inner surface of the wall, by brush or sprayer, of a liquid bituminous coating so prepared that plaster will bond to it, in this way insulating the plaster from the wall; a procedure which has several advantages over the preceding methods, among which advantages may be mentioned the saving in cost because of the simplicity of the process, the insulating efficiency secured by reason of locking the pores in the masonry with an air proof and dampproof compound, and the resultant economy in space as contrasted with the space necessitated in furring and lathing. The one disadvantage of the brush application of a bituminous paint or coating of this character to form a waterproof sheath between masonry and plaster is that since the coating is applied by brushing it cannot be made to form a continuous impervious film over ragged uneven surfaces, as the brush is not able to adequately reach the interstices or depressions. Neither can the application of such compositions by means of spraying devices be recommended for the reason that under the circumstances a relatively large proportion of thinning material is required to give the composition a sufficient degree of fluidity to spray properly. Thus the bituminous base on which depends waterproofing efficiency, is greatly diluted and is correspondingly less effective. Then too, while the work is being carried out, the building in large measure is open on all sides and the slightest breeze will disturb the path of travel of the fine spray, causing a considerable proportion of the atomized material to drift away, often to deposit in places where not desired and thus involve the expense of removing the material where extraneously deposited.

By my invention a fluent composition is secured which overcomes the disadvantage of the brushed-out coating, while possessing the advantage thereof, which may be troweled on a surface and worked into its irregularities, which will adhere well even to damp masonry, and which will form a continuous waterproofing sheath over any surface however rugged, uneven or irregular such surface may be.

My process of preparation enables a composition to be produced in the form of a heavy paste, thick and coherent enough to not drip under the trowel, of sufficient body to not sag after application, but in spite of its high measure of consistency spreading freely and smoothly under the trowel, or in the parlance of the trade—working out not "short" but free and "fatty." Moreover the composition so prepared exhibits a remarkable plasticity enabling application with satisfactory results to expansion joints in concrete, as said composition will expand and contract with the movement of the concrete slab. In a similar manner, used under roof tile, water penetration can be prevented, simply by embedding the laps of Spanish tile, hip rolls, finials, crestings of shingle tile, and the like, in a layer of the plastic composition. Although exposed here to the full heat of the sun's rays the coating remains in place persistently, serving as an efficient waterproof seal. Repairs in roofs, whether of slate, tin, built up slag or gravel strata, may be made simply by troweling on a quantity of said composition to fill and cover the leaky areas. Likewise for covering openings where flashing enters the wall, pointing around flashing, for cementing cap to flashing on the underside, the composition may be used to advantage especially on damp surfaces where ordinary cements fail to properly adhere. Around window frames secure protection can be provided against water-penetration from driving storms by applying the composition to openings under the hanging stile, filling in between frame and wall on stucco exteriors, or in any rift or crevice in the window setting. While plastic enough to be used for filling in spaces and slushing around window frames, the composition trowels in place neatly without sagging and sets without becoming hard and brittle, which is an advantageous feature. Although not running and dripping in the heat of the sun's rays, on the other hand a brittle easily fractured product is not engendered by cold, because of the peculiar irresponsiveness to temperature fluctuations of the compound in its preferred form.

The composition may be prepared without the use of any volatile inflammable thinner, so that in the handling and application of the product, the fire risk is negligible.

Where floor arch and wall join, if the ceilings are to be preserved from dampness, a waterproofing material should be present at such junction. In order to carry their loads, the floor arches become a part of the bearing wall, or must be supported by the steel frame when curtain walls are used. Hence the air space created by furring blocks or by lath and furring strips cannot be continuous. Wherever this is the case, and it is so in every fireproof structure, or for that matter in wooden construction, moisture permeating the outer shell of the building at the point where the arch joins the wall, penetrates the floor arch for some distance at least and affects the plastered ceiling. The arches, usually being made of hollow tile or "strongly diluted" concrete, become as easy prey to the attacks of rain storms and are quickly saturated with moisture at the junction points, causing the ceiling to become stained and discolored. From thence, if furred construction is employed, the moisture will travel down the wall along the surfaces inclosing the air space, saturating and disintegrating the plaster. Whenever then, it becomes desirable to use furring, as often is the case especially if the interior plan of the building requires the trim to be set out from the wall, and the expense of supplementing the effect of the air space by a water insulating coating throughout, is an obstacle, it becomes necessary to seal the space at the junction point where furring and arch meet, as this is the vulnerable point of attack from dampness. My plastic waterproof troweling composition applied at this point overcomes the difficulty experienced with this form of construction, and due to the marked adhesiveness to damp walls exhibited by the aforesaid composition, a remarkable thorough sealing effect is secured with a minimum of coated area.

As indicated, the walls in new construction are always more or less damp and this moisture has a tendency to repel a coating of ordinary bituminous, asphaltic or coal tar mixtures, the action reminding one of the repellent effect of a greasy surface. Wherever moisture is present, the coating film does not bond or key to the surface and after setting may be totally removed with relative ease. The present invention provides a composition, which although possessing an unusually pronounced waterproofing character, is nevertheless, in the form as applied, of such a nature as to overcome the repellent forces due to wall moisture, and hence for the purposes above set forth is of peculiar adaptability.

My plastic troweling waterproof sealing cement comprises a heavy-bodied emulsion of stiffly fluent quality containing an oil basis, preferably thickened with a resinous or asphaltic compound, a water-insoluble soap and a finely divided filler. The emulsion preferably is formed from two immiscible materials, namely the oil basis and a weak aqueous solution of ammonia or similar material; the oil basis being preferably largely in excess of the aqueous solution. The latter in fact preferably should be present only in relatively small proportion so as to form but a modicum of the total weight of the troweling compound. As an oil basis I may use any of the drying oils, as linseed, perilla, Chinese wood or tung oil, and the like, or semi-drying oils including fish, corn, cotton, whale, rape and other like oils. Non-drying oils as petroleum, asphaltic oils and malthas may be employed to some extent or according to circumstances may form the entire oil basis, if desired. Preferably, however, I employ Chinese wood oil usually with an addition of about 10% of boiled fish oil. The oil thickener which I may employ is usually of a resinous nature and includes such bodies as asphalt, gilsonite, copal including manila and kauri, colophonium and other resins. Ozocerite or ceresin wax may be added in moderate amounts for some requirements. The water-insoluble soap preferably is formed *in situ*, that is within the mass of the composition during its preparation. To this end a water-soluble soap preferably ammonium stearate in an aqueous carrier, is incorporated with the oil basis and hydrated lime or other precipitant is then added. The lime soap which forms separates under these conditions in a finely-divided, flocculent or colloidal condition which enables it to exert a desirable water-repelling action. The ammonia liberated by the action of the lime passes more or less into the aqueous material and forms an excellent aid to rapid emulsification. The water-insoluble soap and the aqueous material together have the useful property of permitting additions of fillers, pigments and extending materials, without excessive grinding to secure a proper degree of incorporation. This is of importance with a heavy oil basis in which pigments and fillers are ground with difficulty under most circumstances. The precipitating material for the water-soluble soap may be any metathetically reacting body capable of producing a water-insoluble soap, and this includes Portland cement, barium hydrate, quick lime, cream of lime, as well as hydrated lime. An excess of lime material over the amount of ammonium stearate and the like, should preferably be used. On the other hand a very great excess of lime or other precipitant is undesirable as tending to break the emulsion, and only such a maximum is to be used under ordinary circumstances as will permit the formation of a stable emulsion and one which is free from undesirable tackiness or sticky qualities. The function of the aqueous material in its blended condition is that of a slicking element, it having the property of rendering an otherwise sticky, tacky composition easily handled under the trowel, and action which seemingly is supplemented by the presence of the precipitated lime soap.

In my copending application Serial No. 760,050 now matured into Letters Patent 1,074,364 of Sept. 30, 1913, I have more particularly set forth the use of asphaltic and bituminous containing compositions which yield black or very dark colored plastic cements adapted for use in surfaces which are to be concealed by other finish. The present invention especially concerns the production and use of pigment-containing compositions which may be applied to exposed surfaces to exert not only a waterproofing, but also a decorative effect. Under these circumstances I may supplant the asphaltic or bituminous material with kauri or other copal or similar resinous bodies. Bodies of an asphaltic nature act differently in some respects from the resins, possibly due to the difference in the acid components of these. The ammonia liberated by the reaction of lime on ammonium stearate has an effect on kauri which under certain circumstances may prove undesirable and which may be practically inhibited by the use of free fatty acids especially those derived from drying or semi-drying oils. The free acids of Chinese wood or fish oil are suitable for the purpose, and need not be present in an amount exceeding ten per cent. of the total oil vehicle. These acids should be present in the oil and resin mixture before adding the ammonium stearate and the latter should be introduced before the lime or other precipitating agent is incorporated. Introduction of the lime before the ammonium stearate would not, of course, yield as useful results. The effect of the fatty acid or kauri protector would then be largely nullified.

A formula herewith given as an illustrative embodiment is the following: A thickened oil basis consisting of 70 parts of Chinese wood oil, 10 parts of the free fatty acids of fish oil or Chinese wood oil and 20 parts of kauri is melted and mixed with 40 parts of a thick paste of ammonium stearate in aqueous media. Seventy parts of hydrated lime or Portland cement are then added with thorough agitation. To this composition filling or extending material may be added provided the consistency be not increased to an excessive degree. Among the fillers which may be employed are bodies of the nature of talc or ground soap stone, whiting, barytes, china clay and kaolin, silex and the like. The foregoing proportions are expressed by volume for the particular formula set forth. Preferably, however, in lieu of the foregoing fillers I use strong pigments to produce say four standard colors, gray, brown, red and green, which tints may be secured by the use of suitable alkali—in fast pigments. The gray colored composition is adapted for filling in spaces and slushing around window frames and the other colors mentioned are suited for embedding tile and pointing around flashing. All of these colors and others may be used in coating the exposed surfaces of masonry structures.

The adherence of the pigment-containing sealing compound or cement to damp surfaces overcomes the difficulties hitherto experienced in waterproofing construction of the character aforesaid. Cement and brick walls may be coated with this plastic composition to form a water-impervious layer which for some purposes is markedly superior to paint compositions applied with brush or sprayer, as regards obtaining a decorative finish which has reliable waterproofing qualities; and the present invention comprises the process of finishing surfaces of cement, stucco, brick, plaster and the like involving applying manually by trowel of a layer of such material capable of bonding to damp surfaces while waterproofing same.

What I claim is:

1. The process of making a plastic waterproof troweling cement which comprises melting a varnish gum containing resin acids, incorporating therewith a drying oil and a fatty acid protector of said resin acids, adding hydrated ammonium stearate, agitating and adding a basic body to form a water-insoluble soap *in situ* and to liberate ammonia within the mass.

2. The process of making a plastic waterproof troweling cement which comprises melting a varnish gum containing kauri, incorporating therewith a drying oil and a fatty acid protector of said resin acids, adding hydrated ammonium stearate, agitating and adding a basic body to form a water-insoluble soap *in situ* and to liberate ammonia within the mass.

3. The process of making a plastic waterproof troweling cement which comprises melting a varnish gum containing kauri, incorporating therewith a drying oil and a fatty protector of said resin acids, said fatty acid having siccative properties, adding hydrated ammonium stearate, agitating and adding a basic body to form a water-insoluble soap *in situ* and to liberate ammonia within the mass.

4. The process of making a plastic waterproof troweling cement which comprises melting a varnish gum containing resin acids, incorporating therewith a drying oil and a fatty acid protector of said resin acids, adding a paste comprising ammonium stearate in a hydrated condition, agitating and adding a basic body to form a water-insoluble soap *in situ* and to liberate ammonia within the mass.

5. The process of making a plastic waterproof troweling cement which comprises melting a varnish gum resin containing resin acids, incorporating therewith a drying oil and a fatty acid protector of said resin acids, adding hydrated ammonium stearate, agitating and adding lime material to form a water-insoluble soap *in situ* and to liberate ammonia within the mass.

6. The process of making a plastic waterproof troweling cement which comprises melting a varnish gum containing resin acids, incorporating therewith a drying oil and a fatty acid protector of said resin acids, adding hydrated ammonium stearate, agitating and adding hydrated lime to form a water-insoluble soap *in situ* and to liberate ammonia within the mass.

7. A plastic smooth-troweling composition consisting of a fluent emulsion of heavy consistency comprising varnish gums and siccative oil substantially free from volatile thinner, incorporated with flocculent stearate of lime and a filler comprising calcareous material.

8. A plastic smooth-troweling composition consisting of a fluent emulsion of heavy consistency comprising varnish gum, siccative oil and fatty acids substantially free from volatile thinner, incorporated with flocculent stearate of lime and a filler comprising calcareous material.

9. A plastic smooth-troweling waterproof cement consisting of a fluent emulsion of heavy consistency comprising kauri material dissolved in a non-volatile oily menstruum, incorporated with finely-divided precipated stearate of lime, ammonium hydroxid solution and a finely divided filling material; said cement in application freeing easily from the trowel and being substantially devoid of running or dripping properties.

10. A plastic smooth-troweling cement consisting of a fluent emulsion of heavy consistency comprising kauri material dissolved in a non-volatile menstruum, incorporated with finely-divided precipitated stearate of lime, ammonium hydroxid solution and a finely-divided filling material including a pigment; said cement in manual application freeing easily from the trowel and being substantially devoid of running or dripping properties.

11. A plastic smooth-troweling waterproof cement consisting of a fluent emulsion of heavy consistency comprising kauri material dissolved in a non-volatile menstruum, incorporated with finely-divided precipitated stearate of lime, an emulsifying agent, and finely-divided filling material including a pigment fast to lime; said cement in manual application freeing easily from the trowel and being substantially devoid of running or dripping properties.

12. A plastic smooth-troweling waterproof cement comprising a heavy bodied fluent emulsion comprising oily material carrying a thickener of kauri, a water-insoluble metallo-organic compound comprising a salt of a fatty acid, a solution of an alkali, a filling material and a pigment material fast to alkali.

13. A plastic troweling waterproof sealing cement comprising a heavy bodied emulsion of stiffly fluent quality comprising a thickened oil basis, a water-insoluble soap, a finely-divided filler including a pigment compatible with alkali and a solution of ammonium hydroxid; said cement in manual application freeing easily from the trowel.

14. A plastic troweling composition consisting of a fluent emulsion capable of adhering to moisture-containing walls without running or dripping, comprising an oil, a bodying substance therefor, finely-divided water-insoluble soap, a modicum of an alkali solution and a finely-divided filling material including pigment material compatible with alkali.

Signed at New York city in the county of New York and State of New York this 12th day of May A. D. 1913.

AARON CHARLES HORN.

Witnesses:
ETHEL C. THORNBLADE,
EDWARD D. NEWMAN.

---

Copies of this patent may be obtained for five cents each, by addressing the "Commissioner of Patents, Washington, D. C."